(12) United States Patent
Tanaka et al.

(10) Patent No.: US 7,361,709 B2
(45) Date of Patent: Apr. 22, 2008

(54) COLORED COMPOSITION, METHOD OF MANUFACTURING COLOR FILTER, AND METHOD OF MANUFACTURING BLACK MATRIX SUBSTRATE

(75) Inventors: Hideyo Tanaka, Tokyo (JP); Takumi Saito, Tokyo (JP); Takeshi Itoi, Tokyo (JP); Mizuhiro Tani, Tokyo (JP)

(73) Assignees: Toyo Ink Mfg. Co., Ltd., Tokyo (JP); Toppan Printing Co., Ltd., Tokyo (JP)

( * ) Notice: Subject to any disclaimer, the term of this patent is extended or adjusted under 35 U.S.C. 154(b) by 118 days.

(21) Appl. No.: 10/849,382

(22) Filed: May 20, 2004

(65) Prior Publication Data

US 2004/0236006 A1 Nov. 25, 2004

(30) Foreign Application Priority Data

May 23, 2003 (JP) .............................. 2003-145818

(51) Int. Cl.
- *G02B 5/20* (2006.01)
- *G03F 1/1335* (2006.01)
- *G02F 1/1333* (2006.01)
- *B41J 2/01* (2006.01)
- *C09D 11/00* (2006.01)
- *G03C 1/08* (2006.01)

(52) U.S. Cl. .................... 524/556; 430/7; 430/321; 430/164; 349/106; 96/122; 96/139; 96/140

(58) Field of Classification Search ................ 524/556; 430/7; 349/106
See application file for complete search history.

(56) References Cited

U.S. PATENT DOCUMENTS

| | | | | |
|---|---|---|---|---|
| 4,105,454 A | * | 8/1978 | Tani | 430/572 |
| 5,817,441 A | * | 10/1998 | Iwata et al. | 430/7 |
| 6,013,983 A | * | 1/2000 | Asano et al. | 313/581 |
| 6,893,781 B2 | * | 5/2005 | Nonaka et al. | 430/7 |

FOREIGN PATENT DOCUMENTS

JP 2003-48994 2/2003

* cited by examiner

*Primary Examiner*—Duane Smith
*Assistant Examiner*—Ives Wu
(74) *Attorney, Agent, or Firm*—Nixon & Vanderhye P.C.

(57) ABSTRACT

A colored composition contains a colorant carrier including a transparent resin, a precursor thereof, or a mixture of the transparent resin and the precursor, a colorant, and an organic liquid medium. The organic liquid medium consists of an organic solvent (a) having a boiling point at 760 mmHg of 100° C. or higher but lower than 160° C., and an organic solvent (b) having a boiling point at 760 mmHg of 160° C. or higher but lower than 215° C. The organic solvent (b) is contained in an amount of 3% to 35% by weight based on the total amount of the colored composition.

7 Claims, 1 Drawing Sheet

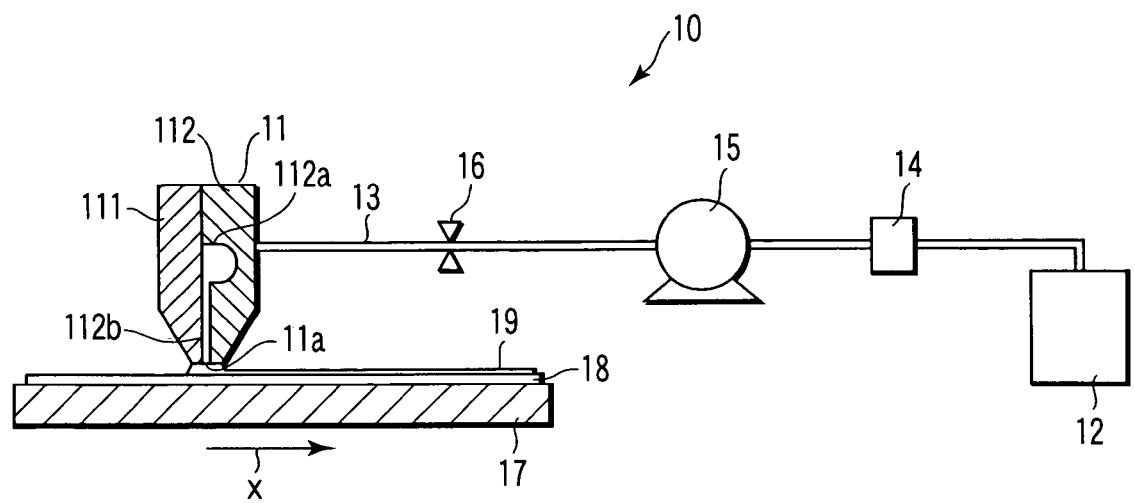
F I G. 1
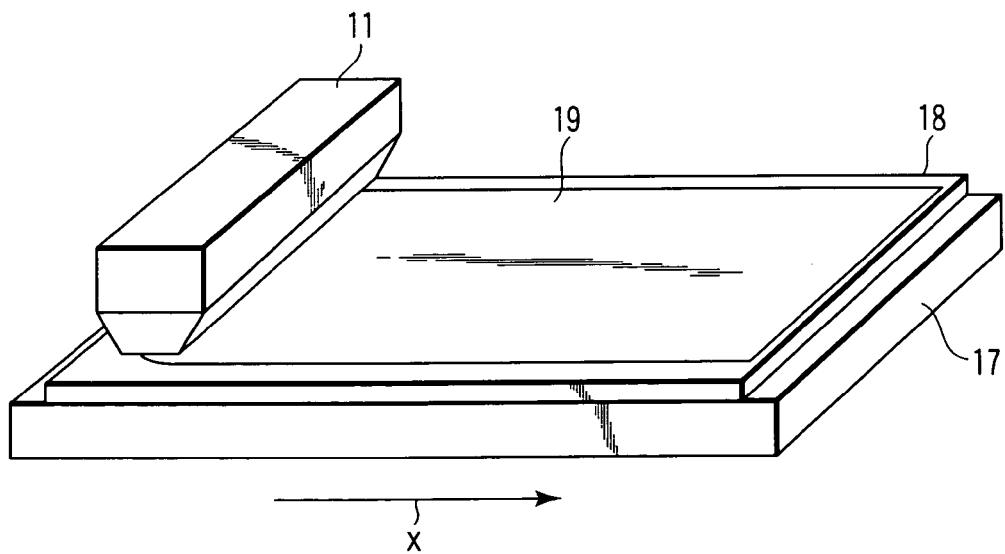
F I G. 2

COLORED COMPOSITION, METHOD OF MANUFACTURING COLOR FILTER, AND METHOD OF MANUFACTURING BLACK MATRIX SUBSTRATE

CROSS-REFERENCE TO RELATED APPLICATIONS

This application is based upon and claims the benefit of priority from prior Japanese Patent Application No. 2003-145818, filed May 23, 2003, the entire contents of which are incorporated herein by reference.

BACKGROUND OF THE INVENTION

1. Field of the Invention

The present invention relates to a colored composition used for manufacturing a color filter and a black matrix included in, for example, a color liquid crystal display device and a color image pick-up tube device, to a method of manufacturing a color filter using such a colored composition, and to a method of manufacturing a black matrix using such a colored composition.

2. Description of the Related Art

In the manufacture of a color filter included in a liquid crystal display (LCD) device, it is necessary to form a uniform film of coating having a thickness of about 1 to 3 μm after drying, by coating a coating liquid on a transparent substrate. In general, a spin coating method is employed in the coating step.

The spin coating method is a coating method in which a coating liquid is applied dropwise onto a transparent substrate while rotating the transparent substrate at a prescribed rotating speed so as to cause the applied coating liquid to be spread centrifugally on the surface of the transparent substrate, forming a film of coating having a thickness which is determined by, for example, the viscosity of the coating liquid and the rotating speed of the transparent substrate.

The spin coating method includes an open-to-air system and a closed cup system. Each of these systems is disadvantageous in that the film of coating is rendered nonuniform in thickness in the radial direction of the transparent substrate such that the film is rendered thicker in the central portion about which the transparent substrate is rotated and in the peripheral portion than in the intermediate portion. A coating composition that permits overcoming the disadvantage noted above is disclosed in, for example, Japanese Patent Disclosure (Kokai) No. 6-3521. The disclosed coating composition contains a pigment, a binder polymer and a radiation-sensitive compound, dissolved or dispersed in a specified organic solvent. This composition, when applied by the spin coating method, permits diminishing the difference in thickness of the film of coating between the central portion and the peripheral portion of the transparent substrate and also permits forming a film excellent in its surface smoothness.

The coating composition noted above certainly permits diminishing the nonuniformity in thickness of the film. However, the spin coating method in general is disadvantageous in that only several percent of a coating liquid applied onto a transparent substrate is utilized for the formation of the film on the transparent substrate, and the remaining coating liquid exceeding 90% scatters out of the transparent substrate, which is wasteful. The waste of a large amount of the coating liquid constitutes nowadays a serious problem with increase in the substrate size.

As a measure for overcoming the above-noted disadvantages inherent in the spin coating method, a die coating method is being studied in recent years as disclosed in, for example, Japanese Patent Disclosure Nos. 7-168015, 2000-193818 and 2001-195004. The die coating method is advantageous in that the. waste of the coating liquid can be suppressed, compared with the spin coating method, and that the supply circuit of the coating liquid including the tip of the coating head forms a closed system.

In the die coating method, however, the coating liquid is exposed to the atmospheric air at the open portion of the slit at the tip of the coating head, with the result that the coating liquid tends to be dried and solidified at the tip of the coating head. It follows that the solidified material of the coating liquid causes the plugging of the slit forming the nozzle and causes the film formed on a glass plate to bear streaks extending in the coating direction. Further, the solidified material of the coating liquid may be released from the tip portion of the coating head so as to be mixed as a foreign matter with the film formed on the glass plate so as to deteriorate the film. Further, where such a defect has been generated, it is necessary in many cases to detach the coating head from the coating apparatus so as to dismantle and clean the coating head. The operation to dismantle and clean the coating head takes a considerably long time, with the result that the reduction in time efficiency of the coating apparatus is not negligibly small.

It is difficult to overcome the difficulty noted above by simply using in the die coating method a composition adapted for use in the spin coating method.

BRIEF SUMMARY OF THE INVENTION

Therefore, an object of the present invention is to provide a colored composition, which is unlikely to be solidified at the tip portion of a discharge opening provided in a die coating apparatus, and, thus, which is effective for preventing the coating defect, as well as a method of manufacturing a color filter using such a colored composition and a method of manufacturing a black matrix substrate using such a colored composition.

A colored composition according to the present invention comprises, as an organic liquid medium, a combination of a first organic solvent having a boiling point at 760 mmHg of 100° C. or higher but lower than 160° C., and a second organic solvent having a boiling point at 760 mmHg of 160° C. or higher but lower than 215° C., and contains a prescribed amount of the second organic solvent. The composition can be prevented from being dried and solidified at the tip portion of a coating liquid discharge opening of a die coating apparatus. As a result, it is possible to eliminate the generation of the defects in the film of coating such as a nonuniform coating.

According to a first aspect of the present invention, there is provided a colored composition comprising a colorant carrier comprising a transparent resin, a precursor thereof or a mixture of the transparent resin and the precursor, a colorant, and an organic liquid medium for the colorant carrier. The organic liquid medium consists of an organic solvent (a) having a boiling point at 760 mmHg of 100° C. or higher but lower than 160° C. and another organic solvent (b) having a boiling point at 760 mmHg of 160° C. or higher but lower than 215° C. The amount of the organic solvent (b) falls within a range of 3% to 35% by weight based on the total amount of the colored composition.

According to a second aspect of the present invention, there is provided a method of manufacturing a color filter, comprising coating, on a transparent substrate, a colored composition according to the present invention by using a die coating apparatus to form a filter segment.

Further, according to a third aspect of the present invention, there is provided a method of manufacturing a black matrix substrate, comprising coating, on a transparent substrate, a colored composition according to the present invention by using a die coating apparatus to form a black matrix.

BRIEF DESCRIPTION OF THE SEVERAL VIEWS OF THE DRAWING

FIG. 1 schematically shows an example of a die coating apparatus; and

FIG. 2 is an oblique view showing the coated state of a coating composition formed by the die coating apparatus shown in FIG. 1.

DETAILED DESCRIPTION OF THE INVENTION

A colored composition according to the present invention will now be described in detail.

A colored composition according to the present invention contains a colorant carrier comprising a transparent resin, a precursor thereof or a mixture of the transparent resin and the precursor; a colorant; and an organic liquid medium. In order to prevent the colored composition from being dried and solidified at the tip portion of the coating liquid discharge opening in the die coating apparatus (die coater), the organic liquid medium consists of an organic solvent (a) having a boiling point at 760 mmHg of 100° C. or higher but lower than 160° C. and another organic solvent (b) having a boiling point at 760 mmHg of 160° C. or higher but lower than 215° C. The content of the organic solvent (b) is 3% to 35% by weight based on the total amount of the colored composition.

The organic solvent (a) has a boiling point at 760 mm of 100° C. or higher but lower than 160° C. Of these, those having a boiling point at 760 mmHg of 130° C. or higher but lower than 160° C. are preferred. In the case of using an organic solvent having a boiling point of lower than 100° C., the organic solvent is evaporated when the resulting colored composition is applied on a transparent substrate. As a result, a coating defect such as a nonuniform coating tends to take place, resulting in failure to obtain a uniform film of coating.

On the other hand, the organic solvent (b) has a boiling point at 760 mmHg of 160° C. or higher but lower than 215° C. Of these, those having a boiling point at 760 mmHg of 160° C. or higher and lower than 205° C. are preferred The content of the organic solvent (b) is 3% to 35% by weight based on the total amount of the colored composition. Preferably, the content of the organic solvent (b) is 5% to 25% by weight based on the total amount of the colored composition. In the case of using an organic solvent having a boiling point of 215° C. or higher, or in the case where the amount of the organic solvent (b) exceeds 35% by weight, the organic solvent is not sufficiently evaporated in the pre-baking stage of the film of coating, with the result that the organic solvent remains inside the film after pre-baking, and the film may remain tacky on its surface. As a result, dust tends to be attached to the surface of the film. In addition, a mask may be contaminated in a proximity light exposure apparatus. In addition, where a large amount of the organic solvent is left unremoved within the film after drying, the dried film may be peeled off from the transparent substrate, particularly, from the glass substrate having a $SiO_2$ film formed on the surface, during the developing treatment.

The organic solvent (a) includes, for example, 2-heptanone (boiling point at 760 mmHg (herein after referred to as "bp"): 150.2° C.), 4-heptanone (bp: 144.1° C.), cyclohexanone (bp: 155.7° C.), n-butyl acetate (bp: 126.3° C.), isobutyl acetate (bp: 116.3° C.), isoamyl acetate (bp: 142.0° C.), n-amyl acetate (bp: 142.0° C.), methyl isobutyl ketone (bp: 119° C.), n-butyl alcohol (bp: 117.7° C.), ethylene glycol monoethyl ether (bp: 135.1° C.), ethylene glycol diethyl ether (bp: 121.4° C.), ethylene glycol monomethyl ether (bp: 124.5° C.), ethylene glycol monopropyl ether (bp: 151.4° C.), ethylene glycol monoisopropyl ether (bp: 141.8° C.), ethylene glycol monomethyl ether acetate (bp: 144.5° C.), ethylene glycol monoethyl ether acetate (bp: 156.3° C.), propylene glycol monomethyl ether (bp: 121.0° C.), propylene glycol monoethyl ether (bp: 132.8° C.), propylene glycol monopropyl ether (bp: 149.8° C.), propylene glycol monomethyl ether acetate (bp: 146° C.), propylene glycol monoethyl ether acetate (bp: 158° C.), methyl-3-methoxypropionate (bp: 142° C.), N,N-dimethylformamide (bp: 153.0° C.), 1,2,3-trichloropropane (bp: 156.9° C.), o-chlorotoluene (bp: 159.3° C.), o-xylene (bp: 144.4° C.), m-xylene (bp: 139.1° C.), methyl lactate (bp: 143.8° C.), ethyl lactate (bp: 154.2° C.), ethyl butyrate (bp: 121.4° C.), and isopropyl butyrate (bp: 128.0° C.). These solvents can be used singly or in the form of a mixture of at least two of these solvents.

The organic solvent (b) includes, for example, 3-methoxy-3-methyl-1-butanol (bp: 174° C.), 1,3-butanediol (bp: 203° C.), 3-methyl-1,3-butanediol (bp: 203° C.), 2-methyl-1,3-propanediol (bp: 213° C.), di-isobutyl ketone (bp: 168.1° C.), ethylene glycol monobutyl ether (bp: 171.2° C.), ethylene glycol monohexyl ether (bp: 208.1° C.), ethylene glycol monobutyl ether acetate (bp: 191.5° C.), ethylene glycol dibutyl ether (bp: 203.3° C.), diethylene glycol monomethyl ether (bp: 194.0° C.), diethylene glycol monoethyl ether (bp: 202.0° C.), diethylene glycol diethyl ether (bp: 188.4° C.), diethylene glycol monoisopropyl ether (bp: 207.3° C.), propylene glycol monobutyl ether (bp: 170.2° C.), propylene glycol diacetate (bp: 190.0° C.), dipropylene glycol monomethyl ether (bp: 187.2° C.), dipropylene glycol monoethyl ether (bp: 197.8° C.), dipropylene glycol monopropyl ether (bp: 212.0° C.), dipropylene glycol dimethyl ether (bp: 175° C.), tripropylene glycol monomethyl ether (bp: 206.3° C.), ethyl 3-ethoxypropionate (bp: 169.7° C.), 3-methoxybutyl acetate (bp: 172.5° C.), 3-methoxy-3-methylbutyl acetate (bp: 188° C.), γ-butyrolactone (bp: 204° C.), N,N-dimethylacetamide (bp: 166.1° C.), N-methylpyrrolidone (bp: 202° C.), p-chlorotoluene (bp: 162.0° C.), o-diethylbenzene (bp: 183.4° C.), m-diethylbenzene (bp: 181.1° C.), p-diethylbenzene (bp: 183.8° C.), o-dichlorobenzene (bp: 180.5° C.), m-dichlorobenzene (bp: 173.0° C.), n-butylbenzene (bp: 183.3° C.), sec-butylbenzene (bp: 178.3° C.), tert-butylbenzene (bp: 169.1° C.), cyclohexanol (bp: 161.1° C.), methylcyclohexanol (bp: 174° C.), butyl lactate (bp: 187° C.), isoamyl butyrate (bp: 184.8° C.), and butyl butyrate (bp: 166.6° C.). These solvents can be used singly or in the form of a mixture of two or more of these solvents.

In the present invention, the organic solvent (a) and the organic solvent (b) are used preferably at a weight ratio of (a):(b)=0.5-30.0:1.0, more preferably at a weight ratio of (a):(b)=1.0-28.0:1.0.

As the colorant contained in the colored composition of the present invention, organic or inorganic pigments can be used singly or in the form of a mixture of a plurality of the pigments. Among these pigments, it is desirable to use a pigment having high color developing properties and having a high resistance to heat, particularly a high resistance to thermal decomposition. Usually, an organic pigment is used in the present invention.

Specific examples of the organic pigments that can be used in the colored composition of the present invention will now be described with reference to the color index number.

Specifically, a red colored composition, which is used for forming red filter segments, may contain a red pigment such as C.I. Pigment Red 7, 9, 14, 41, 48:1, 48:2, 48:3, 48:4, 81:1, 81:2, 81:3, 97, 122, 123, 146, 149, 168, 177, 178, 180, 184, 185, 187, 192, 200, 202, 208, 210, 215, 216, 217, 220, 223, 224, 226, 227, 228, 240, 246, 254, 255, 264 or 272. The red colored composition may additionally contain a yellow pigment or an orange pigment.

A yellow colored composition used for forming yellow filter segments may contain a yellow pigment such as C.I. Pigment Yellow 1, 2, 3, 4, 5, 6, 10, 12, 13, 14, 15, 16, 17, 18, 20, 24, 31, 32, 34, 35, 35:1, 36, 36:1, 37, 37:1, 40, 42, 43, 53, 55, .60, 61, 62, 63, 65, 73, 74, 77, 81, 83, 86, 93, 94, 95, 97, 98, 100, 101, 104, 106, 108, 109, 110, 113, 114, .115, 116, 117, 118, 119, 120, 123, 125, 126, 127, 128, 129, 137, 138, 139, 147, 148, 150, 151, 152, 153, 154, 155, 156, 161, 162, 164, 166, 167, 168, 169, 170, 171, 172, 173, 174, 175, 176, 177, 179, 180, 181, 182, 185, 187, 188, 193 or 199.

An orange colored composition used for forming orange color filter segments may contain an orange pigment such as C.I. Pigment Orange 36, 43, 51, 55, 59 or 61.

A green colored composition used for forming green filter segments may contain a green pigment such as C.I. Pigment Green 7, 10, 36 or 37. The green colored composition may additionally contain a yellow pigment.

A blue colored composition used for forming blue filter segments may contain a blue pigment such as C.I. Pigment Blue 15, 15:1, 15:2, 15:3, 15:4, 15:6, 16, 22, 60 or 64. The blue colored composition may additionally contain a violet pigment such as C.I.

Pigment Violet 1, 19, 23, 27, 29, 30, 32, 37, 40, 42 or 50.

A cyan colored composition used for forming cyan filter segments may contain a blue pigment such as C.I. Pigment Blue 15:1, 15:2, 15:4, 15:3, 15:6, 16 or 81.

A magenta colored composition used for forming magenta filter segments may contain a violet pigment such as C.I. Pigment Violet 1 or 19 in combination with a red pigment such as C.I. Pigment Red 144, 146, 177, 169 or 81. The magenta colored composition may additionally contain a yellow pigment.

Further, a black colored composition used for forming black matrixes may contain, for example, carbon black, aniline black, an anthraquinone black pigment, or a perylene black pigment, more specifically C.I. Pigment Black 1, 6, 7, 12, 20 or 31. It is possible to obtain black color by using a mixture of red, blue and green pigments. It is desirable to use carbon black as the black pigment in view of the price and the light shielding properties. The carbon black may be surface-treated with, for example, a resin. Also, for controlling the color tone, the black colored composition may additionally contain a blue pigment or a violet pigment.

Examples of the inorganic pigment which may be used in the present invention include, for example, metal oxide powder, metal sulfide powder and metal powder, such as barium sulfate, zinc white, lead sulfate, yellow lead oxide, zinc yellow, red iron oxide (red iron (III) oxide), cadmium red, ultramarine, prussian blue, chromium oxide green, cobalt green, amber, titanium black, synthetic iron black, titanium oxide, and iron tetroxide. The inorganic pigment is used in combination with an organic pigment in order to ensure good coating properties, a high sensitivity and good developing properties while taking a good balance between the chroma and the brightness.

The colored composition of the present invention may contain a dye to control the color of the colored composition, in an amount not to lower the heat resistance of the colored composition.

As described previously, the colorant carrier is formed of a transparent resin, a precursor of the transparent resin, or a mixture of the transparent resin and the precursor. The transparent resin is a resin having a light transmittance preferably not lower than 80%, more preferably not lower than 95%, over the entire visible wavelength region of 400 to 700 nm. The transparent resin includes a thermoplastic resin, a thermosetting resin and a photosensitive resin. The precursor of the transparent resin includes a monomer or an oligomer that cures to form a transparent resin upon irradiation with radiation. These transparent resins and the precursors can be used singly or in the form of a mixture of a plurality of these. It is desirable to the colorant carrier in an amount of 10 to 90% by weight, preferably in an amount of 20 to 80% by weight, based on the total solid content of the colored composition.

Examples of the thermoplastic resin noted above include, for example, butyral resins, styrene-maleic acid copolymers, chlorinated polyethylenes, chlorinated polypropylenes, polyvinyl chlorides, vinyl chloride-vinyl acetate copolymers, polyvinyl acetates, polyurethane-based resins, polyester resins, acrylic resins, alkyd resins, polystyrenes, polyamide resins, rubber-based resins, cyclized rubber-based resins, celluloses, polyethylenes, polybutadienes, and polyimide resins. On the other hand, examples of the thermosetting resin include, for example, epoxy resins, benzoguanamine resins, rosin-modified maleic acid resins, rosin-modified fumaric acid resins, melamine resins, urea resins, and phenolic resins.

As the photosensitive resin, use may be made of those resins prepared by reacting a linear polymer having a reactive substituent such as a hydroxyl group, a carboxyl group or an amino group with a (meth)acrylic compound having a reactive substituent such as an isocyanate group, an aldehyde group or an epoxy group or cinnamic acid to introduce a photo-crosslinkable group such as (meth)acryloyl group or a styryl group into the linear polymer. It is also possible to use a half-esterified compound prepared by half-esterifying a linear polymer having an acid anhydride, such as styrene-maleic anhydride copolymer or α-olefin-maleic anhydride copolymer, with a (meth)acrylic compound having a hydroxyl group, such as hydroxyalkyl (meth)acrylate.

The monomers and oligomers that can be used as the precursors of the transparent resin include, for example, various acrylic acid esters and methacrylic acid esters such as methyl (meth)acrylate, ethyl (meth)acrylate, 2-hydroxyethyl (meth)acrylate, 2-hydroxypropyl (meth)acrylate, cyclohexyl (meth)acrylate, β-carboxyethyl (meth)acrylate, polyethylene glycol di(meth)acrylate, 1,6-hexanediol di(meth)acrylate, triethylene glycol di(meth)acrylate, tripropylene glycol di(meth)acrylate, trimethylolpropane tri (meth)acrylate, pentaerythritol tri(meth)acrylate, 1,6-hexanediol diglycidyl ether di(meth)acrylate, bisphenol A diglycidyl ether di(meth)acrylate, neopentyl glycol diglycidyl ether di(meth)acrylate, dipentaerythritol hexa(meth) acrylate, tricyclodecanyl (meth)acrylate, (meth)acrylic acid ester of methyloled melamine, epoxy (meth)acrylate and urethane acrylate, as well as (meth)acrylic acid, styrene, vinyl acetate, hydroxyethyl vinyl ether, ethylene glycol divinyl ether, pentaerythritol trivinyl ether, (meth)acrylamide, N-hydroxymethyl (meth)acrylamide, N-vinylformamide and acrylonitrile. These compounds can be used singly or in the form of a mixture of at least two of these compounds.

Where the colored composition of the present invention is cured by irradiation with an ultraviolet light, a photopolymerization initiator or the like is added to the colored composition.

The photopolymerization initiator includes, for example, an acetophenone-based photopolymerization initiator such as 4-phenoxydichloroacetophenone, 4-t-butyl-dichloroacetophenone, diethoxyacetophenone, 1-(4-isopropylphenyl)-2-hydroxy-2-methylpropan-1-one, 1-hydroxycyclohexyl phenyl ketone, or 2-benzyl-2-dimethylamino-1-(4-morpholinophenyl)-butan-1-one; a benzoin-based photopolymerization initiator such as benzoin, benzoin methyl ether, benzoin ethyl ether, benzoin isopropyl ether, or benzyl dimethyl ketal; a benzophenone-based photopolymerization initiator such as benzophenone, benzoylbenzoic acid, methyl benzoylbenzoate, 4-phenylbenzophenone, hydroxybenzophenone, acrylated benzophenone, or 4-benzoyl-4'-methyldiphenyl sulfide; a thioxanthone-based photopolymerization initiator such as thioxanthone, 2-chlorothioxanthone, 2-methylthioxanthone, isopropylthioxanthone, or 2,4-diisopropylthioxanthone; a triazine-based photopolymerization initiator such as 2,4,6-trichloro-s-triazine, 2-phenyl-4,6-bis(trichloromethyl)-s-triazine, 2-(p-methoxyphenyl)-4,6-bis(trichloromethyl)-s-triazine, 2-(p-tolyl)-4,6-bis(trichloromethyl)-s-triazine, 2-piperonyl-4,6-bis(trichloromethyl)-s-triazine, 2,4-bis(trichloromethyl)-6-styryl-s-triazine, 2-(naphtho-1-yl)-4,6-bis(trichloromethyl)-s-triazine, 2-(4-methoxy-naphtho-1-yl)-4,6-bis(trichloromethyl)-s-triazine, 2,4-trichloromethyl-(piperonyl)-6-triazine, or 2,4-trichloromethyl (4'-methoxystyryl)-6-triazine; a borate-based photopolymerization initiator; a carbazole-based photopolymerization initiators; or an imidazole-based photopolymerization initiators. It is desirable to use the photopolymerization initiator in an amount of 0.5% to 50.0% by weight, more desirably 3.0% to 30.0% by weight, based on the total solid content of the colored composition.

The photopolymerization initiators exemplified above can be used singly or in combination. It is also possible to use a sensitizer together with the photopolymerization initiator. Examples of the sensitizer include, for example, α-acyloxy ester, acylphosphine oxide, methyl phenyl glyoxylate, benzyl, 9,10-phenanthrenequinone, camphor quinone, ethyl anthraquinone, 4,4'-diethylisophthalophenone, 3,3',4,4'-tetra (t-butylperoxycarbonyl)benzophenone, and 4,4'-diethylaminobenzophenone. It is desirable to use the sensitizer in an amount of 0.5% to 60.0% by weight, more desirably 3.0% to 40.0% by weight, based on the total amount of the photopolymerization initiator and the sensitizer.

The colored composition of the present invention can be prepared by finely dispersing a colorant or a colorant composition consisting of a plurality of colorants in a colorant carrier and an organic solvent together with the photopolymerization initiator, as required, by using various dispersing means such as a three-roll mill, a two-roll mill, a sand mill, a kneader or an attritor. Also, it is possible to obtain a colored composition containing a plurality of colorants by mixing fine dispersions each prepared by finely dispersing each of the colorants in a colorant carrier and an organic solvent. In dispersing the colorant in the colorant carrier and the organic solvent, it is possible to use appropriately a dispersion aid such as a resin type pigment dispersant, a surfactant, or a dyestuff or pigment derivative. The dispersion aid produces a prominent effect of dispersing the pigment and preventing the dispersed pigment from being agglomerated again. Therefore, in the case of using a colored composition prepared by dispersing a pigment in a colorant carrier and an organic liquid medium by using a dispersion aid, it is possible to obtain a color filter excellent in its transparency. It is desirable to use the dispersion aid in an amount of 0.5% to 50.0% by weight, more desirably 1.0% to 30.0% by weight, based on the amount of the colorant.

The resin type pigment dispersant has a portion having an affinity for the pigment so as to be adsorbed on the pigment and a portion compatible with the colorant carrier, and is adsorbed on the pigment so as to stabilize the dispersion of the pigment into the colorant carrier. Examples of the resin type pigment dispersant include, for example, polyurethanes, polycarboxylic acid esters such as polyacrylates, unsaturated polyamides, polycarboxylic acids, polycarboxylic acid (partial) amine salts, polycarboxylic acid ammonium salts, polycarboxylic acid alkylamine salts, polysiloxanes, long chain polyamino amide phosphate salts, hydroxyl group-containing polycarboxylic acid esters, modified materials thereof, oil-based dispersant such as an amide formed by the reaction between poly (lower alkylene imine) and a polyester having a free carboxyl group or a salt thereof, water-soluble resins or polymers such as (meth) acrylic acid-styrene copolymers, (meth) acrylic acid-(meth)acrylic acid ester copolymers, styrene-maleic acid copolymers, polyvinyl alcohols and polyvinyl pyrrolidones, polyesters, modified polyacrylates, ethylene oxide/propylene oxide adduct compound, and phosphoric acid esters. These dispersants can be used singly or in the form of a mixture of at least two of these.

The surfactant used in the present invention includes, for example, an anionic surfactant such as sodium lauryl sulfate, polyoxyethylene alkyl ether sulfate, sodium dodecylbenzenesulfonate, an alkali salt of a styrene-acrylic acid copolymer, sodium stearate, sodium alkylnaphthalenesulfonate, sodium alkyl diphenyl ether disulfonate, lauryl sulfate monoethanolamine, lauryl sulfate triethanolamine, ammonium lauryl sulfate, stearic acid monoethanolamine, monoethanol amine of a styrene-acrylic acid copolymer, or polyoxyethylene alkyl ether phosphoric acid ester; a nonionic surfactant such as polyoxyethylene oleyl ether, polyoxyethylene lauryl ether, polyoxyethylene nonyl phenyl ether, polyoxyethylene alkyl ether phosphoric acid ester, polyoxyethylene sorbitan monostearate, or polyethylene glycol monolaurate; a cationic surfactant such as alkyl quaternary ammonium salt or ethylene oxide adducts thereof; and an amphoteric surfactant such as alkyl dimethyl amino acetic acid betaine or alkyl imidazoline. These surfactants can be used singly or in the form of a mixture of a plurality of these surfactants.

The dyestuff derivative or pigment derivative used in the present invention is a compound having a substituent introduced into an organic dyestuff. The organic dyestuff also includes pale yellowish aromatic polycyclic compounds such as naphthalene-based compounds and anthraquinone-based compounds, which are not generally called a dyestuff. It is possible to use in the present invention the dyestuff or pigment derivatives disclosed in, for example, Japanese Patent Disclosure No. 63-305173, Japanese Patent Publication (Kokoku) Nos. 57-15620, 59-40172, 63-17102, and 5-9469. The dyestuff and pigment derivatives can be used singly or in the form of a mixture of a plurality of these.

The colored composition of the present invention may contain a storage stabilizing agent for stabilizing the viscosity of the composition during the storage of the composition over a long period of time. Also the colored composition of the present invention may contain an adhesion improving agent such as a silane coupling agent for improving the adhesion of the colored composition to a transparent substrate. Examples of the storage stabilizing agent include, for example, quaternary ammonium chlorides such as benzyl trimethyl chloride and diethyl hydroxy amine; organic acids such as lactic acid and oxalic acid, and methyl ethers thereof; t-butyl pyrocatechol; organic phosphines such as tetraethyl phosphine and tetraphenyl phosphine; and phosphites. It is desirable to use the storage stabilizing agent in an amount of 0.1% to 30.0% by weight, more desirably 1.0% to 20% by weight, based on the total solid content of the colored composition.

The silane coupling agent used in the present invention includes, for example, a vinyl silane such as vinyl tris(β-methoxyethoxy)silane, vinyl ethoxy silane, or vinyl trimethoxy silane; a (meth)acrylic silane such as γ-methacryloxypropyl trimethoxy silane; an epoxy silane such as β-(3,4-epoxycyclohexyl)ethyl trimethoxy silane, β-(3,4-epoxycyclohexyl)methyl trimethoxy silane, β-(3,4-epoxycyclohexyl)ethyl triethoxy silane, β-(3,4-epoxycyclohexyl)methyl triethoxy silane, γ-glycidoxypropyl trimethoxy silane, or γ-glycidoxypropyl triethoxy silane; an aminosilane such as N-β(aminoethyl) γ-aminopropyl trimethoxy silane, N-β(aminoethyl) γ-aminopropyl triethoxy silane, N-β(amino ethyl) γ-aminopropyl methyl diethoxy silane, γ-aminopropyl triethoxy silane, γ-aminopropyl trimethoxy silane, N-phenyl-γ-aminopropyl trimethoxy silane or N-phenyl-γ-aminopropyl triethoxy silane; and a thiosilane such as γ-mercaptopropyl trimethoxy silane or γ-mercaptopropyl triethoxy silane. It is desirable to use the silane coupling agent in an amount of 0.1% to 30.0% by weight, more desirably 0.1% to 20.0% by weight, based on the total solid content of the colored composition.

The colored composition of the present invention can be prepared in the form of an ink for a gravure offset printing, an ink for a waterless offset printing, an ink for a silk screen printing, or in the form of a solvent developing type colored resist material or an alkali developing type colored resist material. The colored resist material can be prepared by dispersing a colorant in a composition containing a thermoplastic resin, a thermosetting resin or a photosensitive resin, as well as a monomer, a photopolymerization initiator, and an organic liquid medium, noted above.

In general, the colorant is contained in the colored composition in an amount of 1.5 to 45% by weight. Particularly, where a filter segment and a black matrix are formed by the photolithography method, it is desirable for the colorant to be contained in the colored composition in an amount of 1.5 to 15% by weight. Where the filter segment and the black matrix are formed by the printing method, it is desirable for the colorant to be contained in the colored composition in an amount of 1.5 to 45% by weight. Also, it is desirable for the colorant to be contained in the final filter segment or in the final black matrix in an amount of 10 to 65% by weight, more preferably 20 to 55% by weight, with the balance consisting essentially of a resinous binder provided by the colorant carrier.

It is desirable that coarse particles not smaller than 5 μm, preferably not smaller than 1 μm, and more preferably not smaller than 0.5 μm, and the mixed dust are removed from the colored composition of the present invention by using, for example, a centrifugal separator, a sintered filter or a membrane filter.

Also, in order to obtain a uniform film of coating without bringing about an uneven coating, it is preferred that the colored composition of the present invention have a viscosity, which is measured at 25° C. by using an E-type viscometer under a rotating speed of 20 rpm, of not higher than 10 mPa·s, more preferably not lower than 1 mPa·s and not higher than 8 mPa·s.

A method of manufacturing a color filter or a black matrix substrate using the colored composition of the present invention will now be described.

The color filter comprises filter segments on a transparent substrate. The filter segment is formed on the transparent substrate by coating the colored composition of the present invention on the transparent substrate, using a die coating apparatus.

The black matrix substrate comprises a black matrix on a transparent substrate. The black matrix is formed on the transparent substrate by coating the colored composition of the present invention on the transparent substrate, using a die coating apparatus.

The transparent substrate used in the present invention includes a glass plate such as a soda-lime glass plate, a low-alkali borosilicate glass plate, or a non-alkali aluminoborosilicate glass plate, and a resin plate such as a polycarbonate plate, a polymethyl methacrylate plate or a polyethylene terephthalate plate. Transparent electrodes made of, for example, indium oxide or tin oxide may be formed on the surface of the transparent substrate for the driving of a liquid crystal after the paneling.

Preferably, each of the filter segment and the black matrix has a thickness after drying of 0.2 μm to 10 μm, preferably 0.2 μm to 5 μm. It is possible to use, for example, a reduced pressure dryer, a convection oven, an IR oven, or a hot plate for drying the film.

The filter segment for each color and the black matrix can be formed by the photolithography method as follows. Specifically, a colored composition prepared as a solvent developing type or an alkali developing type colored resist material is coated on a transparent substrate to a thickness after drying of 0.2 to 10 μm by using a die coating apparatus. The resultant film, which is dried as required, is exposed to an ultraviolet light through a mask having a prescribed pattern and formed in contact with or not in contact with the film for selectively curing the film. Then, the uncured portion of the film is selectively removed by dipping in a solvent or an alkaline developing solution or by spraying a developing solution onto the film by using, for example, a sprayer so as to form a desired pattern, thereby manufacturing a color filter or a black matrix substrate. Further, it is possible to apply heating, as required, for promoting the polymerization of the colored resist material. In the case of employing a photolithography method, it is possible to manufacture a color filter and a black matrix having an accuracy higher than that in the case of employing the printing method.

For the developing treatment, it is possible to use an aqueous solution of, for example, sodium carbonate or sodium hydroxide as an alkaline developing solution. It is also possible to use an organic alkaline material such as dimethylbenzylamine or triethanolamine. Further, it is possible to add an antifoaming agent or a surfactant to the developing solution.

The developing treating method employed in the present invention includes, for example, a shower developing method, a spray developing method, a dip developing method, and a paddle (liquid piling) developing method.

In order to improve the sensitivity to the exposure to the ultraviolet light, it is possible to coat the colored resist material after drying with a resin soluble in water or in an alkaline solution such as polyvinyl alcohol or a water-soluble acrylic resin. The film of the soluble resin, which is capable of preventing oxygen-induced polymerization inhibition, may be formed on the colored resist material film, followed by allowing the coated film to be exposed to the ultraviolet light.

FIG. 1 schematically shows the construction of an example of a die coating apparatus (die coater) 10, and FIG. 2 is an oblique view schematically showing the state that a transparent substrate is coated with a coating liquid (i.e., the colored composition of the present invention) by using the die coating apparatus shown in FIG. 1.

The die coating apparatus 10 shown in FIG. 1 comprises a coating head 11 and a coating liquid tank 12 storing a coating liquid (i.e., the colored composition of the present invention). The coating head 11 is connected to the coating liquid tank 12 by a pipe. 13. A filter 14, a metering pump 15, and an on-off valve 16 are mounted on the pipe 13 in the order mentioned as viewed from the upstream side of the coating liquid.

The coating head 11 comprises a front lip 111 and a rear lip 112. A manifold 112a communicating with the pipe 13 is arranged within the rear lip 112. A slit-like liquid passageway 112b communicating with the manifold 112a extends downward between the front lip 111 and the rear lip 112 and opens at the lower edge 11a of the coating head 11. Further, a transfer stage 17 is arranged below the coating head 11, and a transparent substrate 18 is disposed on the transfer stage 17.

In operating the die coating apparatus 10, the on-off valve 16 is opened, and the metering pump 15 is driven so as to supply a prescribed amount of the coating liquid from the coating liquid tank 12 into the coating head 11 through the pipe 13. The coating liquid is filtered by the filter 14 and, then, flows into the manifold 112a. The coating liquid further flows from the manifold 112a into the liquid passageway 112b and, then, onto the substrate 18 in the form of a thin and wide band. During the flow of the coating liquid onto the transparent substrate 18, the transparent substrate 18 is moved by the transfer stage 17 in a direction denoted by an arrow X, with the result that the coating liquid forms a film 19 on the transparent substrate 18, as shown in FIGS. 1 and 2.

The present invention will now be described more in detail with reference to Examples of the present invention. Needless to say, however, the present invention should not be limited by the Examples.

In the following Examples and Comparative Examples, the expression "parts" denotes "parts by weight".

First, preparation of the acrylic resin solution used in the Examples and the Comparative Examples will be described. The molecular weight of the resin given in the Examples and the Comparative Examples denotes the weight average molecular weight in terms of polystyrene, which was measured by GPC (Gel Permeation Chromatography).

<Preparation of Acrylic Resin Solution>

Cyclohexanone, 800 parts, was placed in a reaction vessel and heated to 100° C. while supplying a nitrogen gas into the reaction vessel. Then, a mixture of the monomers given below and the thermal polymerization initiator given below was added dropwise for one hour into the reaction vessel under the temperature noted above so as to carry out the polymerization reaction:

| Styrene | 60.0 parts |
|---|---|
| Methacrylic acid | 60.0 parts |
| Methyl methacrylate | 65.0 parts |
| Butyl methacrylate | 65.0 parts |
| Azobisisobutyronitrile | 10.0 parts |

After the dropwise addition, the reaction was further continued for 3 hours at 100° C. Then, a solution prepared by dissolving 2.0 parts of azobisisobutyronitrile in 50 parts of cyclohexanone was added to the reaction mixture, and the reaction was continued for additional one hour at 100° C. so as to obtain a solution of acrylic resin. The weight average molecular weight of the resultant acrylic resin was found to be about 40,000.

After cooled to room temperature, about 2 g of the resin solution was sampled and dried at 180° C. for 20 minutes so as to measure the amount of the nonvolatiles. Then, cyclohexanone was added to the resin solution synthesized above such that the resultant solution contained 20% by weight of the nonvolatiles, thereby obtaining an acrylic resin solution.

EXAMPLE 1

A mixture having a composition given below was uniformly stirred and mixed. Then, the mixture was dispersed for 5 hours in a sand mill by using glass beads each having a diameter of 1 mm, followed by filtering the dispersion by using a filter of 5 μm so as to obtain a dispersion of copper phthalocyanine.

| ε-type copper phthalocyanine pigment (C.I. Pigment Blue 15:6) (Heliogen Blue L-6700F manufactured by BASF Inc.) | 12.0 parts |
|---|---|
| Dispersant (Solsperse 20000 manufactured by Avecia Inc.) | 2.4 parts |
| Acrylic resin solution | 28.1 parts |
| Cyclohexanone | 57.5 parts |

Then, a mixture having a composition given below was stirred to uniform, followed by filtering the mixture by using a filter of 1 μm so as to obtain a blue resist material:

| Copper phthalocyanine dispersion | 45.0 parts |
|---|---|
| Acrylic resin solution | 12.5 parts |
| Trimethylolpropane triacrylate (NK ester ATMPT manufactured by Shin-Nakamura Kagaku K.K. | 4.8 parts |
| Photopolymerization initiator (Irgacure 907 manufactured by Ciba Specialty Chemicals Inc.) | 2.5 parts |
| Sensitizer (EAB-F manufactured by Hodogaya Kagaku K.K.) | 0.2 part |
| Cyclohexanone | 25.0 parts |
| Dipropylene glycol monomethyl ether | 10.0 parts |

EXAMPLES 2-9 AND COMPARATIVE EXAMPLES 1-4:

The resist material for each color was obtained as in Example 1, except that the amounts of the pigment, the dispersant, the resin, the monomer, the photopolymerization initiator, the sensitizer and the solvent were changed as shown in Table 1. Incidentally, the amount shown in Table 1 denotes the weight ratio with the total amount of the resist material set at 100.

TABLE 1

|  | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| Color | Blue | Blue | Blue | Blue | Blue | Red | Green | Black | Blue |
| Pigment | 5.40 | 5.40 | 5.40 | 5.40 | 5.40 | 6.10 | 5.60 | 7.00 | 7.02 |
| Dispersant | 1.08 | 1.08 | 1.08 | 1.08 | 1.08 | 1.24 | 1.12 | 1.40 | 1.40 |
| Acrylic resin | 5.02 | 5.02 | 5.02 | 5.02 | 5.02 | 4.66 | 4.78 | 3.60 | 6.53 |
| Monomer | 4.80 | 4.80 | 4.80 | 4.80 | 4.80 | 4.60 | 4.80 | 5.00 | 6.24 |
| Photopolymerization initiator | 2.50 | 2.50 | 2.50 | 2.50 | 2.50 | 2.20 | 2.50 | 1.80 | 3.25 |
| Sensitizer | 0.20 | 0.20 | 0.20 | 0.20 | 0.20 | 0.20 | 0.20 | 0.20 | 0.26 |
| Solvent A | 71.00 | 36.00 | 61.00 | 46.00 | 76.00 | 71.00 | 71.00 | 71.00 | 65.30 |
| Solvent B | 10.00 | — | — | — | — | 10.00 | 10.00 | 10.00 | 10.00 |
| Solvent C | — | 30.00 | — | — | — | — | — | — | — |
| Solvent D | — | 15.00 | 20.00 | 35.00 | — | — | — | — | — |
| Solvent E | — | — | — | — | 5.00 | — | — | — | — |
| Solvent F | — | — | — | — | — | — | — | — | — |
| Solvent G | — | — | — | — | — | — | — | — | — |

|  | Comp. Ex. 1 | Comp. Ex. 2 | Comp. Ex. 3 | Comp. Ex. 4 |
|---|---|---|---|---|
| Color | Blue | Blue | Blue | Blue |
| Pigment | 5.40 | 5.40 | 5.40 | 5.40 |
| Dispersant | 1.08 | 1.08 | 1.08 | 1.08 |
| Acrylic resin | 5.02 | 5.02 | 5.02 | 5.02 |
| Monomer | 4.80 | 4.80 | 4.80 | 4.80 |
| Photopolymerization initiator | 2.50 | 2.50 | 2.50 | 2.50 |
| Sensitizer | 0.20 | 0.20 | 0.20 | 0.20 |
| Solvent A | 81.00 | 61.00 | 71.00 | 41.00 |
| Solvent B | — | — | — | 40.00 |
| Solvent C | — | — | — | — |
| Solvent D | — | — | — | — |
| Solvent E | — | — | — | — |
| Solvent F | — | 20.00 | — | — |
| Solvent G | — | — | 10.00 | — |

The materials shown in Table 1 are as follows:

Blue pigment: ε-type copper phthalocyanine pigment (C.I. Pigment Blue 15:6), which is Heliogen Blue L-6700F manufactured by BASF Inc.

Red pigment:

| | |
|---|---|
| Diketopyrolopyrrole pigment (C.I. Pigment Red 254), which is Irgaphor Red B-CF manufactured by Ciba Specialty Chemicals Inc. | 5.08 parts |
| Anthraquinone pigment (C.I. Pigment Red 177), which is Cromophtal Red A2B manufactured by Ciba Specialty Chemicals Inc. | 0.82 part |
| Anthraquinone pigment (C.I. Pigment Yellow 199), which is Cromophtal Yellow GT-AD manufactured by Ciba Specialty Chemicals Inc. | 0.20 part |

Green pigment:

| | |
|---|---|
| Halogenated copper phthalocyanine pigment (C.I. Pigment Green 36), which is Lionole Green 6YK manufactured by Toyo Ink Mfg. Co., Ltd. | 3.25 parts |
| Monoazo pigment (C.I. Pigment Yellow 150), which is Fanchon Fast Yellow Y-5688 manufactured by Bayer Inc. | 2.35 parts |

Black pigment: carbon black (Printex 75 manufactured by Degussa Inc.;

Dispersant: Solsperse 20000 manufactured by Avecia Inc.;

Monomer: Trimethylolpropane triacrylate (NK ester ATMPT manufactured by Shin-Nakamura Kagaku K.K.);

Photopolymerization initiator: Irgacure 907 manufactured by Ciba Specialty Chemicals Inc.;

Sensitizer: EAB-F manufactured by Hodogaya Kagaku K.K.;

Solvent A: Cyclohexanone (bp: 155.7° C.);

Solvent B: Dipropylene glycol monomethyl ether (bp: 187.2° C.);

Solvent C: Propylene glycol monomethyl ether acetate (bp: 146.0° C.);

Solvent D: Ethylene glycol monobutyl ether (bp: 171.2° C.);

Solvent E: N-methylpyrrolidone (bp: 202.0° C.);

Solvent F: Methyl ethyl ketone (bp: 79.6° C.);

Solvent G: Dipropylene glycol (bp: 231.8° C.)

The viscosity at 25° C. of each of the resist materials obtained in Examples 1 to 9 and Comparative Examples 1 to 4 was measured by using an E-type viscometer manufactured by Tokimec Inc. at a rotating speed of 20 rpm. Also, a glass substrate was coated with the resist material thus obtained as shown in FIG. 2 by using the coating apparatus of the construction shown in FIG. 1, followed by pre-baking the glass substrate coated with the resist material at 70° C. for 20 minutes so as to obtain a dried film. The streaks were evaluated by the visual observation. Table 2 shows the result. The marks ○, Δ and x shown in Table 2 in respect of the streak generation represent the situations given below:

○: Streaks were not recognized at all.

Δ: Streaks were slightly recognized.

x: Streaks were prominently recognized.

Also, the dryness of the film was evaluated in accordance with JIS-K5600. Table 2 also shows the results. The marks ○, Δ and x shown in Table 2 in respect of the dryness of the film represent the situations given below:

○: Tackiness was not recognized at all.

Δ: Tackiness was slightly recognized.

x: Tackiness was prominently recognized.

TABLE 2

|  | Ex. 1 | Ex. 2 | Ex. 3 | Ex. 4 | Ex. 5 | Ex. 6 | Ex. 7 | Ex. 8 | Ex. 9 | Comp. Ex. 1 | Comp. Ex. 2 | Comp. Ex. 3 | Comp. Ex. 4 |
|---|---|---|---|---|---|---|---|---|---|---|---|---|---|
| Color | Blue | Blue | Blue | Blue | Blue | Red | Green | Black | Blue | Blue | Blue | Blue | Blue |
| Viscosity of resist material | 5.4 | 4.1 | 4.8 | 4.6 | 5.2 | 7.0 | 6.2 | 6.4 | 12.1 | 5.7 | 5.3 | 6.0 | 6.1 |
| Streaks | ○ | ○ | ○ | ○ | ○ | ○ | ○ | ○ | Δ | X | X | ○ | ○ |
| Dryness of coating | ○ | ○ | ○ | Δ | ○ | ○ | ○ | ○ | ○ | ○ | ○ | X | X |

In each of Examples 1 to 3 and 5 to 8, the resist material was not solidified at the tip of the coating head. As a result, the generation of streaks was not recognized at all in each of these films and, thus, these films were uniform. Moreover, a tackiness was not observed on the surface of the film.

The film obtained in Example 4 was free from generation of streaks and was uniform. However, the tackiness was slightly observed in the film of Example 4.

The film obtained in Example 9 was free from the tackiness on the surface of the film. However, streaks were slightly generated.

On the other hand, the resist material was solidified at the tip of the coating head in each of Comparative Examples 1 and 2. As a result, streaks were prominently generated on the surface of the film obtained in each of these Comparative Examples and, thus, the film was nonuniform. On the other hand, streaks were not generated in the film obtained in each of Comparative Examples 3 and 4. However, the dryness was insufficient in the film for each of these Comparative Examples, with the result that a prominent tackiness was recognized on the surface of the film.

The experimental data clearly support that the colored composition of the present invention permits forming a uniform film without giving rise to the generation of streaks caused by the solidification of the coating liquid. Also, in the case of using the colored composition of the present invention, it is possible to overcome the difficulty that a large amount of an organic solvent is caused to remain inside the film. It follows that the colored composition of the present invention makes it possible to obtain a dry tack-free film.

Under the circumstances, the use of the colored composition of the present invention permits improving the operation rate of the facilities for manufacturing a color filter and a black matrix substrate so as to make it possible to manufacture a high quality color filter and a high quality black matrix substrate at a high yield.

What is claimed is:

1. A colored composition comprising a colorant carrier comprising a transparent resin, a precursor thereof or a mixture of the transparent resin and the precursor, a colorant, and an organic liquid medium, the organic liquid medium consisting of an organic solvent (a) having a boiling point of 130° C. or higher but lower than 160° C. at 760 mm Hg and an organic solvent (b) having a boiling point of 160° C. or higher but lower than 215° C. at 760 mm Hg, a content of the organic solvent (b) falling within a range of 3% to 35% by weight based on the total amount of the colored composition, wherein a weight ratio of the solvent (a) to the solvent (b) is 76.00:5.00 to 46.00:35.00.

2. The colored composition according to claim 1, wherein the colored composition has a viscosity of not higher than 10 mPa·s at 25° C.

3. The colored composition according to claim 1, wherein the colorant is contained in an amount of 1.5% to 45% by weight.

4. The colored composition according to claim 1, wherein the colorant carrier is present in an amount of 10 to 90% by weight based on the total solid content of the colored composition.

5. The colored composition according to claim 1, wherein a weight ratio of the organic solvent (a) to the organic solvent (b) is 0.5-30.0:1.0.

6. A method of manufacturing a color filter, comprising coating, on a transparent substrate, a colored composition according to claim 1 by using a die coating apparatus to form a filter segment.

7. A method of manufacturing a black matrix substrate, comprising coating, on a transparent substrate, a colored composition according to claim 1, in which the colorant is a black colorant, by using a die coating apparatus to form a black matrix.

* * * * *